J. B. Gathright,
Stirrup Loop.
No. 112,800. Patented Mar. 21, 1871.
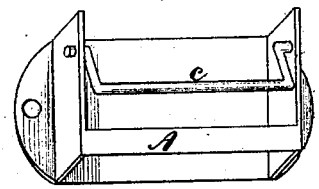
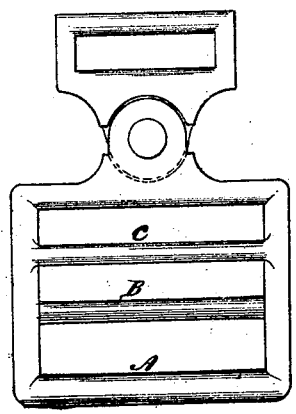
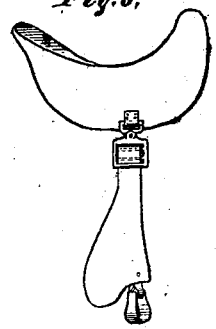
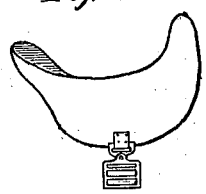
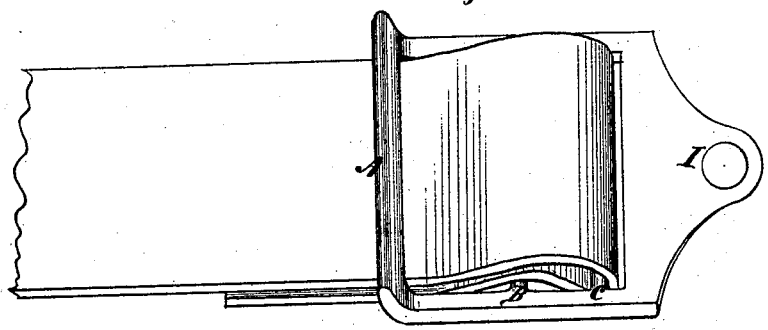
Witnesses: Inventor:
O. Gathright Jr. J. B. Gathright
Lewis Botto

United States Patent Office.

JOSIAH B. GATHRIGHT, OF LOUISVILLE, KENTUCKY.

Letters Patent No. 112,800, dated March 21, 1871.

IMPROVEMENT IN LOOPS FOR STIRRUPS.

The Schedule referred to in these Letters Patent and making part of the same.

I, JOSIAH B. GATHRIGHT, of the city of Louisville, county of Jefferson, State of Kentucky, have invented new and useful Improvements in Stirrup-Loops and method of attaching stirrups to saddles; and the following is a full and clear description of the same, reference being had to the accompanying drawing making a part of this specification.

The general object of my invention is to provide a method and means of securing stirrups to saddles, of that class which has the movable "fender" skirt, without the use of a buckle on the stirrup-leather, and without the necessity of connecting the upper and lower ends of the stirrup-leather together.

By the usual method the stirrup-leather passes along the under side of the "fender," secured to it by loops or rivets, with a portion of its length extending beyond each end of the fender. The upper end is passed through the loop or hole in the tree, and turned down and secured to the other end, which has been passed through the stirrup and turned upward to meet it.

Another method in use is to use two straps instead of one continuous stirrup-leather, one secured to the upper end of the "fender" and the other to the lower end, the ends passing through the loop or hole and stirrup respectively, and turned together and secured as before.

My invention consists in providing a stirrup-loop, preferably in the form as shown in Figure 1, which will not only answer the purpose of an ordinary loop, but, by means of extra bars suitably arranged with respect to each other, will firmly secure the strap, thus avoiding the necessity of connecting it with the strap (or end) which passes through the stirrup, and thereby saving much leather.

The stirrup-loop (see fig. 1) is preferably in two pieces. The upper piece is provided with a horizontal slot, through which a sheet-iron strap may be passed to secure it to the tree, (see Figure 3.) The lower part is preferably hinged or jointed to the upper part, as seen in fig. 1, thus allowing free motion to the stirrup without wearing the leather.

The loop may be in one piece, substantially as seen in Figure 2, having a suitable staple-hole in its upper portion, so that it may be secured to the tree by a staple and move freely with the stirrup.

The loop has three bars, or equivalents, as seen in figs. 1 and 2, and the strap being passed under the lower one, A, and over around the upper one, C, and back over B, is held firmly in position by the friction and compression which that arrangement produces.

The manner of putting in the strap is shown in fig. 2. The fender is secured to this strap by rivets or other known means, (see fig. 3,) unless they should be cut in one piece, and the stirrup is secured to the lower part of the fender by a metal hook riveted to the lower part of the fender, or by leather strap, (see fig. 3,) or other means substantially the same.

In this way nearly all the leather ordinarily used in stirrup-leathers is saved, and the loops on the fenders and the buckles, which so often chafe horses and injure the girth-attachments of the saddle, are dispensed with.

I am aware that this method of securing the ends of straps is not new; but the adaptation and application of it to this purpose is novel, and works economical results that are very considerable and peculiar to this application of it.

It may sometimes be desirable to place the loop higher up, resting upon the bar of the tree instead of swinging below it, in which case the form shown in Figure 4 would be desirable for the loop.

In that case the bottom plate of the casting (or the surface of the tree) may take the place of the bar B, and the bar C would be movable in slots or hinged, as shown in fig. 4, to facilitate the adjustment of the strap, and to more effectually secure it under the changed circumstances.

What I claim as my invention, and desire to secure by Letters Patent, is—

The method, substantially as herein shown and described, of attaching stirrups to saddles, and also, as specific means to this end, the stirrup-loops operating substantially as shown and described.

JOSIAH B. GATHRIGHT.

Witnesses:
O. GATHRIGHT, Jr.,
R. M. DENNIS.